June 10, 1941.  H. G. ALM  2,244,738
LIGHTING FIXTURE
Filed Jan. 12, 1939
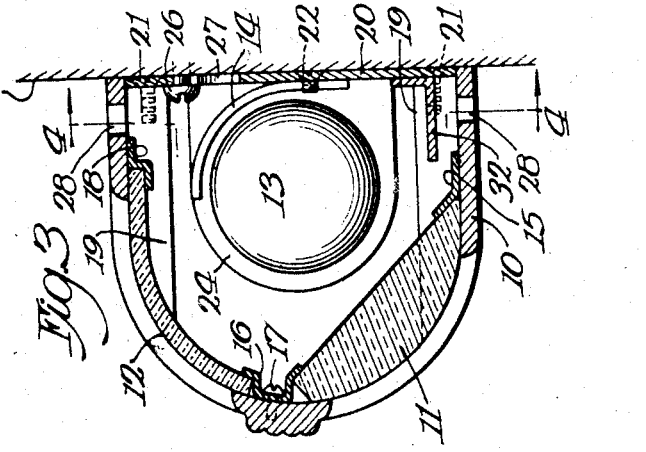
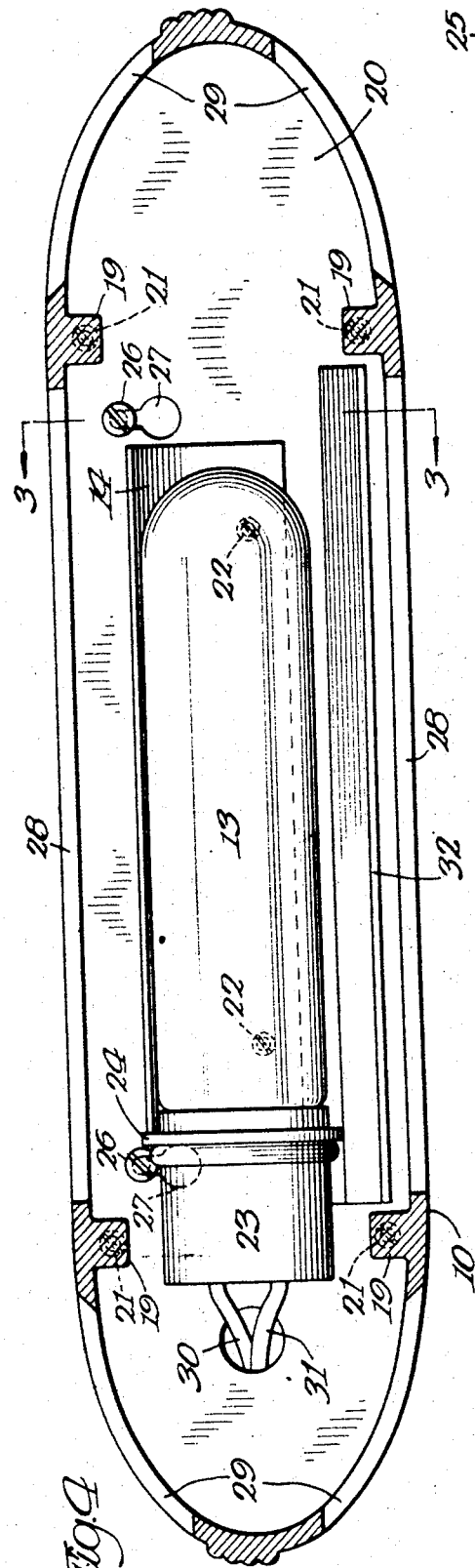
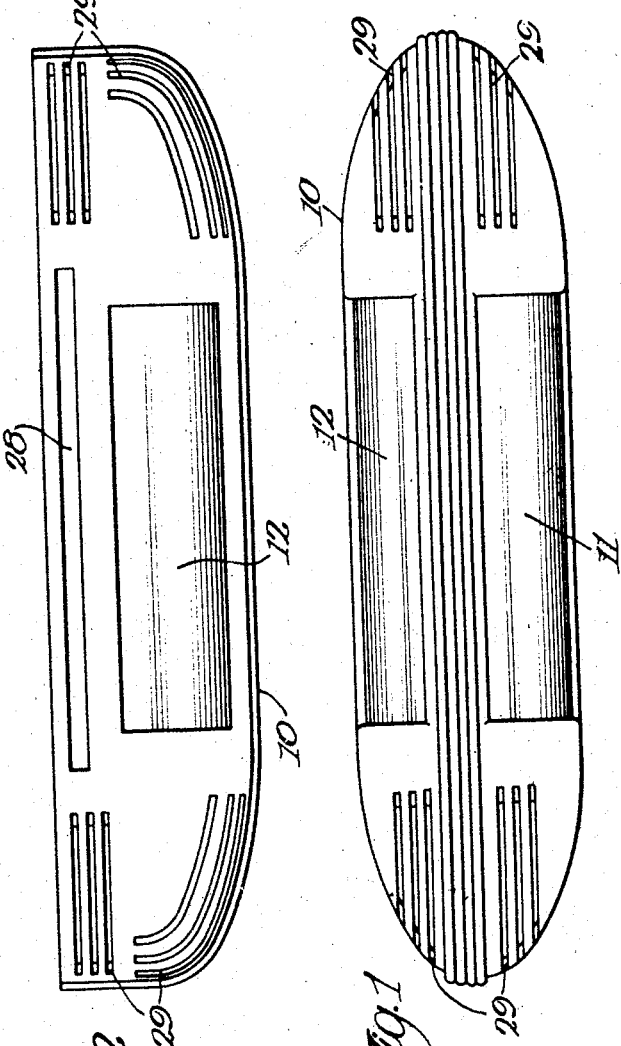
Inventor:
Henry G. Alm
By Mann, Brown & Co.
Attys.

Patented June 10, 1941

2,244,738

UNITED STATES PATENT OFFICE 2,244,738

LIGHTING FIXTURE

Henry G. Alm, Elkhart, Ind., assignor to The Adlake Company, a corporation of Illinois Application January 12, 1939, Serial No. 250,546

5 Claims. (Cl. 240—7.3)

The principal object of the present invention is to provide a well ventilated lighting fixture which is simple in construction, pleasing in appearance, and one which will furnish a concentrated light area and at the same time will provide diffused lighting so as to furnish an adequate amount of general illumination.

Other objects and advantages will become apparent as the disclosure proceeds and the description is read in conjunction with the accompanying drawing, in which Fig. 1 is a front elevational view of the lighting fixture fully assembled, showing the lenses and some of the ventilating slots;

Fig. 2 is a top view of the fixture shown in Fig. 1;

Fig. 3 is a transverse sectional view taken on the line 3—3 of Fig. 4; and

Fig. 4 is an enlarged longitudinal sectional view taken on the line 4—4 of Fig. 3.

A particular embodiment of the invention is selected for the purpose of disclosure only in compliance with Section 4888 of the Revised Statutes, and it is recognized that many modifications and changes can be made without departing from the present invention.

The lighting fixture forming the subject matter of the present invention is particularly well suited for use as a berth light in a railway sleeping car and comprises, broadly, a cover 10, a pair of lenses 11 and 12, an electric bulb 13, and a reflector 14 positioned behind the bulb.

As best shown in Figs. 1 and 2, lenses 11 and 12 extend lengthwise of the lighting fixture and are positioned below and above, respectively, the longitudinal center line of the fixture. Lens 11 is a condensing lens adapted to concentrate a portion of the light issuing from the bulb 13 onto the reading plane of the passenger using the light and is supported on the cover 10 by a supporting strip 15 affixed along its one edge to the cover 10, and by a flanged channel member 16, which in turn is held in place by a plurality of machine screws 17.

The lens 12 is a diffusing lens made of some translucent material and is supported on the cover 10 by a Z bar 18 affixed to the cover 10 along one edge and by the flanged channel member 16.

As best shown in Fig. 4, the cover 10 is provided with a plurality of integral lugs 19, and a back plate 20 (see Fig. 3) is secured to the cover by means of machine screws 21 which thread into the lugs 19. The reflector 14 is carried by the back plate 20, and machine screws 22 serve as the securing means.

An electric socket 23 is secured to the back plate 20 by a bracket 24, and the light bulb 13 screws into the socket. When the fixture is fully assembled with its back in place, the unit may be mounted on the wall, generally indicated in Fig. 3 at 25, by hooking it onto screws 26, previously threaded into the wall. The screw heads enter the large portions of keyhole slots 27, and then the unit is lowered so as to move the shank of the screws into the narrow portions of the slots.

The reflector 14 is so positioned with respect to the light bulb 13 and the lenses 11 and 12 that the majority of light reflected from its surface passes through the condensing lens 11, thereby directing more light through this lens than through the light diffusing lens 12. In this manner, the majority of light issuing from the light bulb is utilized for illuminating the reading plane and only a minor portion of the light is utilized for general illumination purposes.

Longitudinal slots 28 are provided at the top and at the bottom of the fixture between the lenses and the wall, and other slots 29 are provided at both ends of the fixture. The function of these slots, in addition to their decorative value, is to provide additional ventilation for the interior of the fixture.

Electrical conductors 30 and 31 pass through the fixture back 20 and are electrically connected to the socket 23 in any well known manner.

Although the reflector 14 is shown as being separate from the back 20, obviously a reflecting surface could be provided on the inside face of the back 20; but it should be so arranged with respect to the light bulb 13 and the condensing lens 11 that the majority of light reflected from this reflecting surface passes through condensing lens 11.

A shield 32 is positioned between the electric light bulb and the lower ventilating slot (as shown in Fig. 3) so as to intercept any light rays that might otherwise pass through the ventilating slot.

I claim:

1. A lighting fixture comprising a back plate adapted to be mounted on a substantially flat surface, an elongated bowl-shaped cover substantially symmetrical with respect to its longitudinal axis and having elongated openings on opposite sides of the plane of symmetry, an elongated light bulb in the fixture behind the cover and disposed lengthwise of the cover, mounting means for supporting the bulb close to the back plate and adapted to connect it to a circuit, a pair of light transmitting members including an elongated light collecting lens positioned in one of the openings in the cover and extending at least approximately the length of the bulb, and a light diffusing member in the other of said openings in the cover extending at least approximately the length of the bulb, an elongated reflector extending longitudinally of the bulb and disposed rearwardly thereof to reflect light therefrom through one of the light transmitting members, said cover substantially concealing said bulb, reflector and mounting means.

2. A lighting fixture comprising a back plate adapted to be mounted on a substantially flat surface, an elongated bowl-shaped cover substantially symmetrical with respect to its longitudinal axis and having elongated openings on opposite sides of the plane of symmetry, an elongated light bulb in the fixture behind the cover and disposed lengthwise of the cover, mounting means for supporting the bulb close to the back plate and adapted to connect it to a circuit, a pair of light transmitting members including an elongated light collecting lens positioned in one of the openings in the cover and extending at least approximately the length of the bulb, and a light diffusing member in the other of said openings in the cover extending at least approximately the length of the bulb, an elongated reflector extending longitudinally of the bulb and disposed rearwardly thereof and curved about the bulb to reflect light therefrom through one of the light transmitting members, said cover substantially concealing said bulb, reflector and mounting means.

3. A lighting fixture comprising a back plate adapted to be mounted on a substantially flat surface, an elongated bowl-shaped cover substantially symmetrical with respect to its longitudinal axis and having elongated openings on opposite sides of the plane of symmetry, an elongated light bulb in the fixture behind the cover and disposed lengthwise of the cover, mounting means for supporting the bulb close to the back plate and adapted to connect it to a circuit, a pair of light transmitting members including an elongated light collecting lens positioned in one of the openings in the cover and extending at least approximately the length of the bulb, and a light diffusing member in the other of said openings in the cover extending at least approximately the length of the bulb, an elongated reflector extending longitudinally of the bulb and disposed rearwardly thereof to reflect light therefrom through the light collecting lens, said cover substantially concealing said bulb, reflector and mounting means.

4. A lighting fixture comprising a back plate adapted to be mounted on a substantially flat surface, an elongated bowl-shaped cover substantially symmetrical with respect to its longitudinal axis and having elongated openings on opposite sides of the plane of symmetry, an elongated light bulb in the fixture behind the cover and disposed lengthwise of the cover, mounting means for supporting the bulb close to the back plate and adapted to connect it to a circuit, a pair of light transmitting members including an elongated light collecting lens positioned in one of the openings in the cover and extending at least approximately the length of the bulb, and a light diffusing member in the other of said openings in the cover extending at least approximately the length of the bulb, an elongated reflector extending longitudinally of the bulb and disposed rearwardly thereof and curved about the bulb to reflect light therefrom through the light collecting lens, said cover substantially concealing said bulb, reflector and mounting means.

5. A lighting fixture comprising a back plate adapted to be mounted on a substantially flat surface, an elongated bowl-shaped cover having elongated openings on opposite sides of a plane of symmetry extending longitudinally of the cover, an elongated light bulb in the fixture behind the cover and disposed lengthwise of the cover, mounting means for supporting the bulb close to the back plate and adapted to connect it to a circuit, a pair of light transmitting members including an elongated light collecting lens positioned in one of the openings in the cover and extending at least approximately the length of the bulb, and a light diffusing member in the other of said openings in the cover extending at least approximately the length of the bulb, an elongated reflector extending longitudinally of the bulb and disposed rearwardly thereof to reflect light therefrom through one of the light transmitting members, said cover substantially concealing said bulb, reflector and mounting means, the outside surfaces of the collecting lens and diffusing member being substantially symmetrical about the plane of symmetry.

HENRY G. ALM.